United States Patent [19]

Zeuner et al.

[11] Patent Number: 4,638,974
[45] Date of Patent: Jan. 27, 1987

[54] ELECTROHYDRAULIC VALVE ASSEMBLIES AND METHOD

[76] Inventors: Kenneth W. Zeuner, 43 Red Fox Dr., New Hope, Pa. 18938; Steven K. Zeuner, 39 Larch Cir.; Thomas A. Zeuner, 230 Woodlake Dr., both of Holland, Pa. 18966

[21] Appl. No.: 568,599

[22] Filed: Jan. 6, 1984

[51] Int. Cl.$^4$ ............................................. F16K 31/02
[52] U.S. Cl. .............................. 251/129.15; 335/260; 251/129.01
[58] Field of Search ................... 251/129, 141, 129.15, 251/129.08, 129.01; 137/269; 335/278, 260

[56] References Cited

U.S. PATENT DOCUMENTS

| | | | |
|---|---|---|---|
| 1,772,879 | 8/1930 | Stearns | 251/129 |
| 1,954,804 | 4/1934 | Doble | 251/129 |
| 3,082,359 | 3/1963 | Mangiafico et al. | 335/260 |
| 3,469,590 | 9/1969 | Barker | 251/129 |
| 3,737,141 | 6/1973 | Zeuner | 251/129 |
| 3,765,644 | 10/1973 | Zeuner | 251/129 |
| 4,540,154 | 9/1985 | Kolchinsky et al. | 335/278 |

Primary Examiner—Kenneth J. Dorner
Assistant Examiner—Gerald A. Anderson
Attorney, Agent, or Firm—Ratner & Prestia

[57] ABSTRACT

A solenoid operated valve assembly formed of a ferromagnetic end stop section and body section, an orifice section and a sleeve section of low magnetically permeable material. The sleeve section has an inner chamber with a centrally disposed portion of reduced diameter. Each of the sections is completely finished before assembly so that no further finishing operations are required. Predetermined sections are selected and a valve assembly is assembled by threading one end of the sleeve section to the end stop section and the other end to the body section. The orifice section is threaded to the body section to form a completed valve assembly.

11 Claims, 10 Drawing Figures

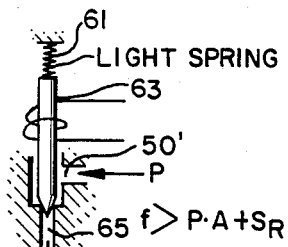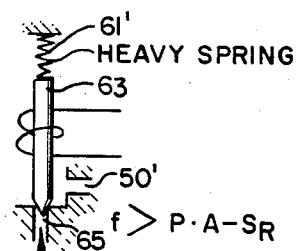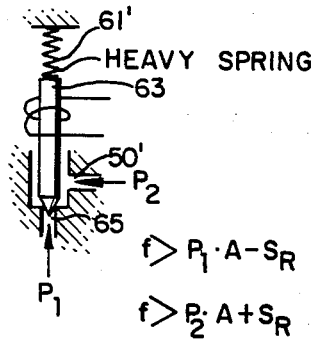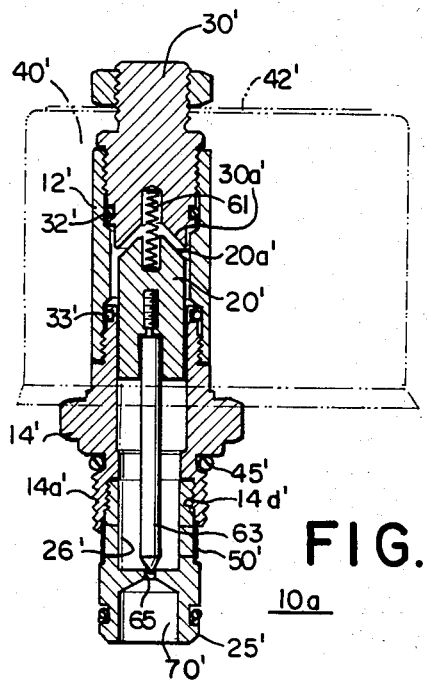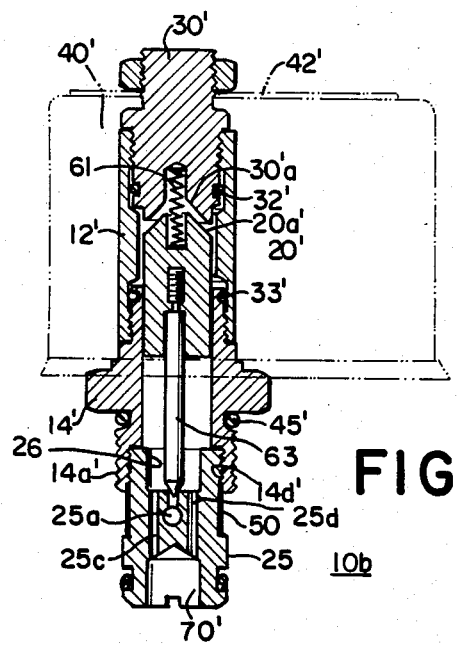

ELECTROHYDRAULIC VALVE ASSEMBLIES AND METHOD

This application is being filed concurrently with application Ser. No. 06/568,659, Reversing Orifice Assembly for an Electrohydraulic Valve Assembly having similar subject matter and the same applicants.

BACKGROUND OF THE INVENTION

A. Field of the Invention

This invention relates to the field of solenoid operated electrohydraulic poppet valve assemblies and methods for making them.

B. Background Art

Prior solenoid operated valve assemblies as disclosed, for example, in U.S. Pat. No. 3,737,141 are formed of an upper valve housing having a low magnetically permeable spacer brazed or welded between a ferromagnetic end stop section and a ferromagnetic body section. This welding or brazing has been objectionable in that the weldments or brazements formed slag in the inner armature bore of the valve housing. In addition, weld flux or brazing compound has been deposited in the bore. Accordingly, machining has been required to remove the slag and weld flux or brazing compound formed within the inner armature bore. Additionally, machining has been required to straighten the bore due to off-center distortion caused by welding or brazing. Thereafter, expensive refinishing of the armature bore has been essential. All of these operations have required the use and availability of highly skilled machinists and operators and have been very costly and time consuming. Since the armature bore is effectively hidden, quality control has been difficult and costly.

A further problem has been that objectionable pin holes have been formed in the weldment which may not show up until the valve assembly reaches the actual user in the field. At that time such pin holes have caused problems or actual failure. For example, flux has been formed in the pin holes and then after being blown out by the high pressure these pin holes create leaks in the valve.

A still further disadvantage of prior valve assemblies has been that they could not be disassembled or repaired in the field. In order to make repairs in the field, for example, the entire welded or brazed valve housing would have to be replaced and this replacement was in effect a replacement of the entire valve assembly.

Accordingly, an object of the present invention is a solenoid operated poppet valve assembly having a valve housing which is formed of individually machined and finished threaded sections. The sections may be threadedly assembled and tested to form desired valve assemblies by an OEM manufacturer such as a farm machinery company without requiring the use of machine tools or highly skilled machinists and operators.

SUMMARY OF THE INVENTION

A solenoid operated valve assembly which is formed of a ferromagnetic body section, a ferromagnetic end stop section, an orifice section and a sleeve section of low magnetically permeable material. The sleeve section has an inner chamber with upper and lower internally threaded portions. Each of the sections is completely finished so that no further finishing operations are required. In assemblying the valve assembly, predetermined ones of the sections are selected to form a desired valve assembly for a particular application. After selection, the sleeve section is threaded to a threaded portion of the end stop section and is also threaded to an upper threaded portion of the body section. The orifice assembly is threaded to a lower threaded portion of the body section thereby to form a completed valve assembly.

BRIEF DESCRIPTION OF THE DRAWINGS

FIG. 4 is an elevational sectional view of another embodiment of the invention comprising a normally closed solenoid operated valve assembly in the valve closed state.

FIG. 5 is an elevational sectional view of a further embodiment of the invention comprising a normally close solenoid operated valve assembly in the valve closed state.

FIGS. 6A-C schematically illustrates different modes of operation of the valve assemblies of FIGS. 4,5.

DETAILED DESCRIPTION OF THE INVENTION

Figure 1:
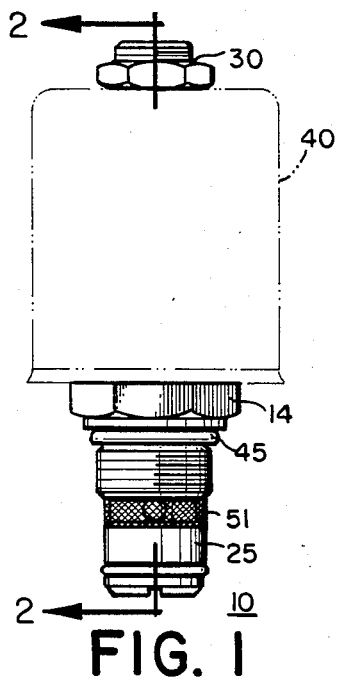
FIG. 1 is a plan view of a normally open solenoid operated valve assembly of the present invention.
Figure 2:
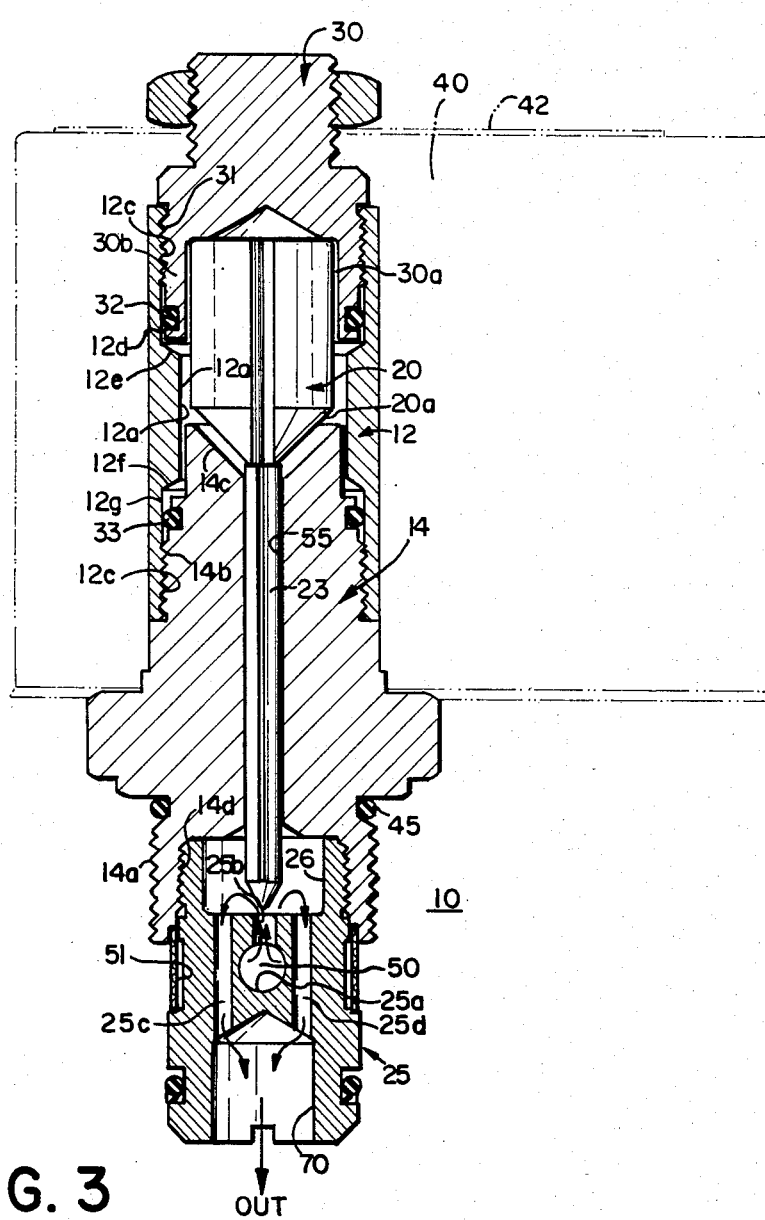
FIG. 2 is an elevational sectional view of the valve assembly of FIG. 1 taken along lines 2—2 in the valve normally open state.
Figure 3:
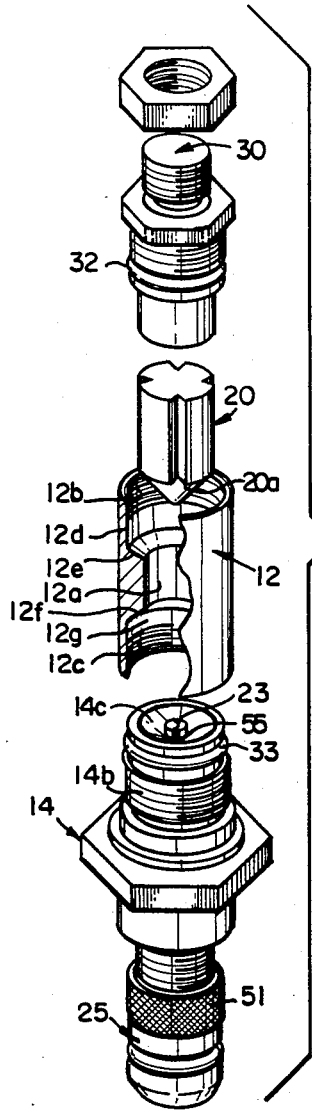
FIG. 3 is an exploded view of many of the valve elements of FIG. 2.

Referring now to FIGS. 1-3, there is shown a single stage normally open solenoid operated poppet valve assembly 10 of the conventional cartridge type adapted to be installed in a manifold block. Valve assembly 10 comprises a central body section 14 which at a lower portion threadedly engages a threaded orifice assembly 25. Section 14 at its upper portion threadedly engages a universal spacer or sleeve 12 which in turn threadedly engages an end stop section 30. For cartridge mounting purposes, outer threads 14a are formed on a lower portion of body section 14 to threadedly engage the internal threads of an opening in a conventional manifold block (not shown). O-ring 45 provides sealing between assembly 10 and the block.

Sleeve 12 for normally open valve assembly 10 is common or interchangeable with the sleeves used in the normally closed valve assemblies of FIGS. 4 and 5. Sleeve 12 has an outer cylindrically shaped smooth finished surface and an inner chamber 15 with an internal reduced diameter cylindrical surface 12a. Chamber 15 together with internal chamber 30a of end stop section 30 and internal chamber 14c of body section 14, form the internal chamber or housing for armature 20.

Sleeve assembly 12 is symmetrical about reduced diameter inner surface 12a, with an upper internally threaded portion 12b and an identical lower internally threaded portion 12c. Portion 12b threadedly engages outer threads 31 of a lower portion of end stop section 30 and threaded portion 12c threadedly engages outer threads 14b of an upper portion of body section 14. Threaded portion 12b extends downwardly into a flat somewhat reduced diameter portion 12d having a good finish which is adapted to engage an O-ring 32 disposed on the outer surface of end stop section 30 below threads 31. Flat portion 12d then extends downwardly and inwardly to form shoulder 12e until reaching the reduced inner diameter surface 12a. It will be understood that shoulder 12e is formed as a drill point. In similar manner, sleeve 12 has a lower shoulder 12f which slopes from surface 12a downwardly and outwardly to an increased diameter inner flat portion 12g having a good finish to engage an O-ring 33 disposed on the outer surface of body section 14 above threads 14b.

End stop section 30 and body section 14 are made of very high magnetically permeable material which is defined as ferromagnetic. On the other hand, sleeve assembly 12a is made of very low magnetically permeable but high strength material such as, for example, 303 or 304 Series stainless steel. As previously described the inner chamber for armature 20 is essentially formed by reduced inner diameter portion 12a, inner chamber 30a of end stop section 30 and chamber 14c having a downwardly extending inner conical shape. It will be seen that portion 12a in its transverse dimension to the outer surface provides a substantial dimension for a strong "hoop" strength for sleeve 12 and thus for valve assembly 10. Otherwise, sleeve would have the tendency of expanding at its center when the armature chamber is subjected to a high internal pressure such as, for example, 20,000 psi.

It will be understood that, as pressure increases within the internal chambers of valve assembly 10, such pressure has the effect of decreasing the gap between O-rings 32,33 and flats 12d, 12g of sleeve 12. This effect also occurs in the other embodiments of FIGS. 4,5. More particularly, as pressure increases in the chamber housing armature 20, wall 30b of chamber 30a expands outwardly toward land 12d. In this manner the clearance between O-ring 32 and land 12d is reduced with the advantage of increasing the sealing effect. This decreases the O-ring extrusion or chance of moving. This action also operates with respect to O-ring 33 and the wall formed by conical surface 14c of body section 14. This wall moves to a much lesser extent in view of its relative thickness.

The lower portion of body section 14 has an internally threaded portion 14d for threadedly engaging the outer upper threads of reversing orifice assembly 25. Assembly 25 has filter screen 51 covering an inlet port 50 leading to a transversely directed central chamber 25a in fluid communication with an upwardly extending orifice 25b which provides a seat for a lonqitudinally extending poppet 23. Fluid flow may be traced from inlet 50, chamber 25a through orifice 25b, orifice assembly inner chamber 26 and then through channels 25c,d to outlet port 70. Vertical channels 25c,d are disposed parallel to and on either side of orifice 25b. An axis normal to the long axes of both channels 25c,d is also normal to the axis of channel 25a. Poppet 23 is cylindrically shape with one flat side and moves axially within longitudinal cylindrical chamber 55 of body section 14. Thus the fluid flow may also be traced through chamber 55 to chamber 15. Poppet 23 is adapted to be actuated at its upper end by the downward movement of armature 20.

It will be seen that the air gap between the lower conical wall 20a of armature 20 and the inner conical surface 14c defining a pole piece is substantially centered with respect to the long dimensions of (1) the reduced inner diameter section 12a of sleeve 12 and (2) coil 40. It will be understood that this increases the efficiency of valve assembly 10.

For a source of magnetic flux there is provided a coil 40 which receives in its central opening, end stop section 30, sleeve 12 and the upper portion of section 14. A cover 42 encloses and protects coil 40. Cover 42 as well as armature 20, end stop section 30 and body section 14 are formed of a high magnetically permeable material (ferromagnetic). The circuit of magnetic flux lines produced by coil 40 when energized may be traced through section 30 and its wall 30b through the air gap to armature 20 and then through the air gap between surfaces 20a, 14c and body section 14 and back to the coil 40. In valve 10, the electromagnetic force necessary to close the valve must be greater than the pressure under poppet 23 tending to open the poppet times the area of orifice 25b.

Referring to FIG. 4, there is shown a normally closed solenoid operated poppet valve assembly 10a of cartridge type having a sleeve assembly 12 identical with that of assembly 10. Sleeve 12 threadedly and rigidly engages end stop section 30' and body section $14^1$ in the manner previously described with respect to valve 10. Sections similar $14^1$ and $30^1$ of valve 10a are similar in outer configuration and shape to that of sections 14 and 30. Further, section $30^1$ has a pole piece surface $30a^1$ of conical shape extending inwardly and upwardly to correspond with the conical surface $20a^1$ of armature $20^1$. A spring 61 is received within a longitudinally extending chamber within surface $30a^1$ and $20a^1$ bias armature $20^1$ downwardly tending to close the valve. A poppet 63 is secured within a centrally located lower inner chamber of armature $20^1$ downwardly tending to close the valve. A poppet 63 is secured within a centrally located lower inner chamber of armature $20^1$ and extends to close an orifice 65 of orifice assembly $25^1$ which threadedly engages body section 141 in the manner previously described with respect to valve 10.

Further in the manner previously described, section 12a is centrally located with respect to the gap formed between surfaces $20a^1$ and $30a^1$. Further, the pressure in the armature chamber is effective to move wall $14^1$ to compress O-ring land 12g. It will be understood that the length of sleeve assembly 12 is important since it determines the overall structural length of valve assemblies 10, 10a and 10b and thus the stroke length of the armature in each of these assemblies.

Normally closed solenoid operated poppet valve assembly 10b is the same as assembly 10a except that orifice assembly 25 is the same as that used with valve assembly 10.

The flow over and under poppet 63 in valve assemblies 10a,b will now be described in detail with respect to normally closed valve assembly 10a. In the mode shown in FIG. 6A, spring 61 is a light spring and fluid flow is applied through port $50^1$ so there is pressure over poppet 63. In this manner light spring 61 is effective just to overcome gravity of the poppet, for example. Thus, the electromagnetic force to open orifice 65 must be greater than the pressure times the area of orifice 65 plus the spring rate. For example, if there is 10 pounds of force over poppet 63, then 10 pounds of electromagnetic force would be necessary to balance out that force In the mode of FIG. 6B, pressure is applied through port or channel 70 to orifice 65 to provide pressure under the poppet and thus the outlet is port $50^1$. In this mode spring 61 may be a heavy spring and thus the electromotive force necessary to open poppet 63 must be greater than the spring rate minus the force of the fluid pressure times the area of orifice 65. This embodiment provides a high response since there is a balancing of force.

The mode of FIG. 6C also uses a heavy spring but provides a multifunction with orifice 65 being of reduced diameter. The presssure may be under or over poppet 63. In the case where pressure is under the poppet and applied through port 70, the electromagnetic force to open the poppet must be greater than the spring rate minus the force of the pressure in port 70 times the orifice area. On the other hand, where the pressure is applied, over the poppet the electromotive force must be greater than the pressure times the orifice area plus the spring rate.

The foregoing modes or embodiments have different advantages. The mode of FIG. 6A has the advantage of low leakage while the advantage of the embodiment of FIG. 6B is high response. The mode of FIG. 6C, provides an effective bidirectional valve, which may be used as an unload valve for raising and lowering a load. Thus, only one unload valve is necessary for a multiple bidirectional function.

It will also be understood that the mode of FIG. 6A may define a check valve using pressure under the poppet. The mode of FIG. 6B may form a relief valve also with pressure under the poppet.

It will be understood that the modes or embodiments of FIGS. 6A-C may be used with respect to valve assembly 10b of FIG. 5. However, with assembly 10b, as previously described, pressure flow into side port 50 provides pressure under the poppet while flow into port 70 provides pressure over the poppet. Assembly 10b has an important advantage with manifolds drilled to provide pressure into side port 50 and where pressure under the poppet is required. In such applications assembly 10b may be used without modification. Thus, in the field, if assembly 10a were being used and side flow and pressure under poppet were then required, it would only be necessary to remove the orifice assembly 25¹ and replace it with the reversing orifice assembly 25.

METHOD OF MANUFACTURE

In the method of manufacture, each of the individual parts of valve assemblies 10, 10a, 10b may be individually completely finished. No further finishing would be required after assembly or after reassembly in the field. Each of the individual finished parts may be quality controlled to a desired quality and then, for example, loaded into a conventional automatic assemblying machine. When a particular valve assembly were required, then only those particular parts needed would be automatically selected and then assembled to produce the desired valve assemblies. It will be understood that in all of the valve assemblies the same universal spacer 12 is used.

After assembly no further machining is required and it is then only necessary to test the part. Thus, manufacture may be fully automated without requiring skilled machinists. Assembly may be accomplished by non-skilled workers using a minimum number of parts. This is particularly useful for users of electrohydraulic valves who do not ordinarily employ skilled machinists. It will be further understood that it is substantially easier and less costly to quality control each of the finished valve parts and particularly section 30, sleeve 12 and section 14 rather than quality control the entire valve assembly. Specifically, the entire assembly has effectively hidden inner bores and chambers which are very difficult and costly to quality control.

It will further be understood that the valve assemblies according to the invention may be assembled and disassembled for repair and installation with various options in the field. For example for valve 10, if a manual override were desired to be installed in the field, it would only be necessary to first remove assembly 10 from the manifold block, remove end stop section 30 and replace it with a new end stop section having a manual override as disclosed, for example, in U.S. Pat. No. 3,765,644. This change may be done not only in the field but during actual manufacture to thereby minimize inventory during manufacture.

Further with respect to interchangeability in factory assembly or in field assembly, valve assemblies 10, 10a and 10b may be configured for use with various manifold cavities of the users. Specifically the cartridge type valve assemblies 10, 10a and 10b may be provided with body sections having threaded portions 14a, for example, to fit an SAE 8 cavity, an SAE 10, and SAE 12 or other such cavities. It will be understood that in the method of manufacture, prior to assembly, the desired body section may be selected in the manufacturing operation while maintaining all of the other sections and parts of the assembly the same. Thus, it will be understood that in accordance with the invention the valve assembly is adapted to any existinq manifold cavity with a minimum number of parts to meet such requirements.

Figure 7:
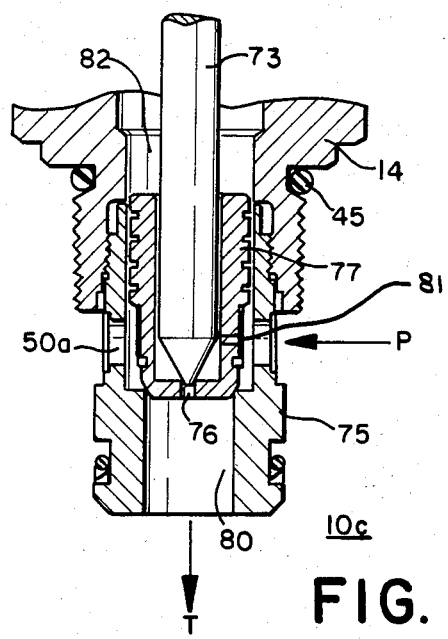
FIG. 7 a fractional sectional view of still a further embodiment of the invention in which the poppet of assembly 10a of FIG. 4 operates a second stage valve.

Referring now to FIG. 7, there is shown in valve assembly 10c, a further embodiment of normally closed assembly 10a in which the orifice assembly 25' is replaced with a second stage orifice assembly 75. In valve assembly 10c, a second stage poppet 77 receives a first stage poppet 73. Pressure flows as illustrated through port 50a and port 81 to chamber 82 and over second stage poppet 77. If valve assembly 10c were energized, poppet 73 is raised, and, thus, there is a flow from chamber 82 through orifice 76 and outlet port 80 to tank. Since port 81 is of substantially smaller dimension than orifice 76, a differential pressure is produced between the pressure in chamber 82 and that of port 80 thereby to raise second stage poppet 77.

Figure 8:
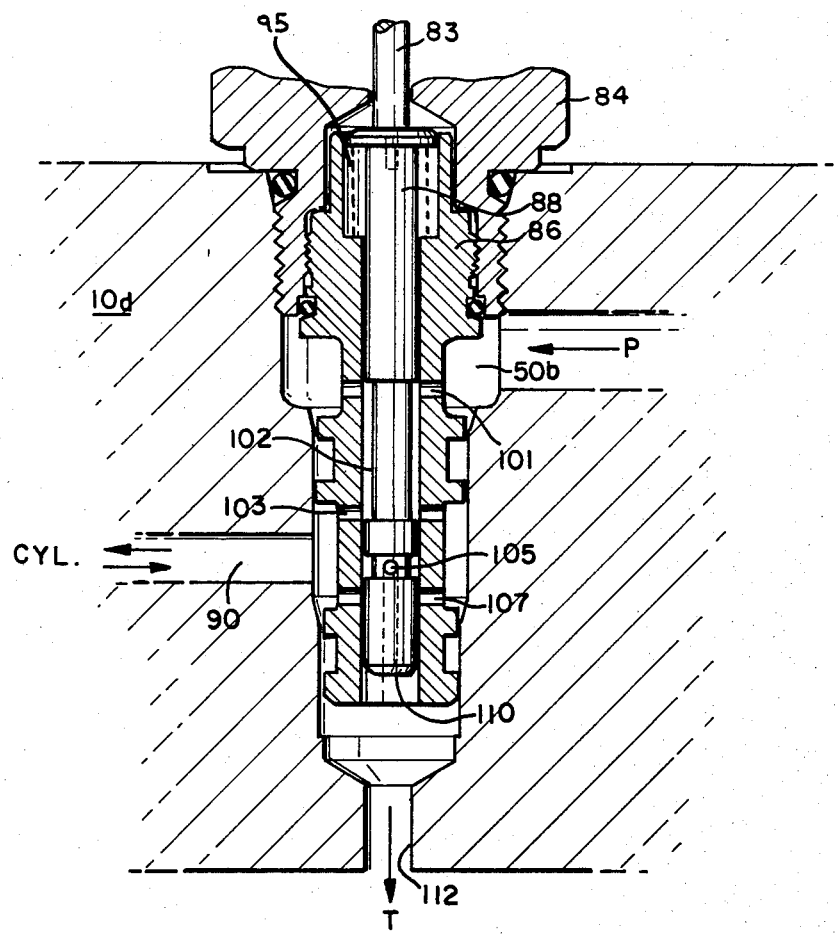
FIG. 8 is a fractional sectional view of still another embodiment of the invention in which the normally open assembly of FIG. 1 operates a spool valve assembly.

Referring to FIG. 8 in valve assembly 10d, there is shown a further embodiment of normally open assembly 10 of FIG. 2 in which assembly 25 is replaced by a spool cage 86 sealingly received within an elongated cavity in the manifold. A spool 88 is received within an inner bore of cage 86 and is engaged for downward movement by a poppet 83 of the type shown generally in FIG. 2. For upward movement, a spring 95 is used to upwardly bias spool 88. In operation, in the illustrated position, pressure flow may be traced through chamber 50b, fluid passages 101 and 102 and then through passage 103 in cage 86 and thence to cylinder port 90. Upon energization of valve assembly 10d, poppet 83 moves downwardly to push spool 88 to a lower position to close passag 101 thereby to close pressure inlet 50b. In this lower position, fluid passage 105 moves into fluid communication with passage 107 so that fluid flows from cylinder port 90 through passages 107 and 105 and then through longitudinal passage 110 to tank port 112.

Although the invention has been particularly shown and described with reference to a preferred embodiment thereof, it will be understood by those skilled in the art that various changes may be made therein without departing from the spirit or scope of the invention.

What is claimed is:

1. A solenoid operated valve assembly having an armature comprising
    a body section having high magnetically permeable material and having an upper threaded portion,
    an end stop section having high magnetically permeable material and having a lower threaded portion,
    an orifice assembly for controlling flow of fluid being secured to the body section,
    plug means engaging the armature and movable between a valve closed state with the plug means seating in and closing the orifice assembly and a valve open state,
    a unitary sleeve section of low magnetically permeable material having an inner chamber with upper and lower portions, upper and lower portions have internally threaded upper and lower threaded sections which are adapted to threadedly engage the threaded portion of the end stop section and the upper threaded portion of the body section, respectively, means for fluidly sealing the upper and lower portions with respect to the end stop section and the body section, respectively,
    an internal pressure chamber for housing the armature formed by the end stop section, the inner chamber of the sleeve section and the body section and the body section in fluid communication with the orifice assembly whereby the sleeve section is of sufficient strength to withstand the pressure of the fluid within the inner chamber of the sleeve section, and
    means for producing and concentrating magnetic flux flow through the end stop section, the armature and the body section for moving the armature and the plug means.

2. The valve assembly of claim 1 in which said sleeve section within the inner chamber includes a centrally disposed portion of diameter reduced with respect to upper and lower portions of the inner chamber.

3. The valve assembly of claim 2 in which the sleeve section inner chamber is substantially symmetrical about the centrally disposed reduced diameter portion.

4. The valve assembly of claim 3 in which upper and lower internally threaded portions are substantially identical.

5. The valve assembly of claim 3 in which the body section has a passage for receiving the plug means and for providing fluid flow between the orifice assembly and the internal chamber.

6. The valve assembly of claim 5 in which the body section has a lower threaded portion and the orifice assembly has an upper threaded portion adapted to threadedly engage the lower threaded portion of the body section.

7. The valve assembly of claim 5 in which the sleeve section upper portion is flat between the upper threaded section and the reduced diameter portion and the lower portion is flat between the lower threaded section and the reduced diameter portion.

8. The valve assembly of 7 in which there is provided first O-ring means disposed on the end stop section below the threaded portion adapted for engaging the upper flat portion of the sleeve section.

9. The valve assembly of claim 8 in which there is provided a second O-ring means disposed above the threaded portion of the body section adapted to engage the lower flat portion of the sleeve section.

10. The valve assembly of claim 9 in which an end stop wall and a body section wall are formed by the portions of the pressure chamber defined by the end top section and the body section respectively, whereby the fluid pressure is effective to outwardly move the walls of the end stop section and the body section thereby to reduce the clearance between the first and second O-ring means and the first and second flat portions, respectively.

11. The valve assembly of claim 10 in which reduced diameter portion is centered with respect to the gap between the armature and the body section.

* * * * *